United States Patent [19]
Koski et al.

[11] 4,176,380
[45] Nov. 27, 1979

[54] ADAPTIVE SPEED/INTERBLOCK GAP CONTROL FOR TAPE DRIVE

[75] Inventors: John A. Koski; Richard B. Weaver, both of San Jose, Calif.

[73] Assignee: International Business Machines Corporation, Armonk, N.Y.

[21] Appl. No.: 868,005

[22] Filed: Jan. 9, 1978

[51] Int. Cl.² ............................................. G11B 5/09
[52] U.S. Cl. ...................................... 360/50; 360/53; 360/73; 360/74.1
[58] Field of Search ..................... 360/50, 73, 74, 53, 360/39; 340/146.3 A

[56] References Cited
U.S. PATENT DOCUMENTS

| | | | |
|---|---|---|---|
| 3,325,769 | 6/1967 | Otto et al. | 360/50 |
| 3,364,495 | 1/1968 | McFadden et al. | 360/50 |
| 3,582,568 | 6/1971 | Ban | 360/73 |
| 3,586,789 | 6/1971 | Butcher et al. | 360/73 |
| 3,596,007 | 7/1971 | Price et al. | 360/73 |
| 3,662,364 | 5/1972 | Patel et al. | 360/53 |
| 3,684,298 | 8/1972 | Ban | 360/73 |
| 3,805,286 | 4/1976 | Kavanagh et al. | 360/73 |
| 3,978,407 | 8/1976 | Forney, Jr. et al. | 340/146.1 A X |

*Primary Examiner*—Vincent P. Canney
*Attorney, Agent, or Firm*—Henry E. Otto, Jr.

[57] ABSTRACT

Apparatus and method for controlling a reel-to-reel tape drive so that its performance characteristics are optimized to best suit the operational mode or availability of a host system by modifying tape speed adaptively according to predetermined conditions sensed during processing of data (i.e., while the tape is in motion). For example, tape might initially be fed at a high speed suitable for archiving; but if more than a predetermined number of "backhitches" (overruns of the interblock gap, IBG) occur during processing of a preselected number of successive blocks of data, the host will cause tape speed automatically to be reduced to a lower rate. This lower rate will enable the tape to stop in the IBG and is therefore suitable for intermittent processing.

Preferably, before reducing speed during write operations, appropriate signals are generated at the host to command an increase in the IBG from a normal distance to a larger distance if backhitches exceed said preselected number. If this fails to reduce backhitches to an acceptable level, speed will be reduced to the lower rate and the gap preferably restored to its normal distance.

10 Claims, 4 Drawing Figures

ADAPTIVE SPEED/INTERBLOCK GAP CONTROL FOR TAPE DRIVE

BACKGROUND OF THE INVENTION

This invention relates to apparatus and methods for controlling tape drive apparatus and more particularly relates to reel-to-reel tape drive apparatus controlled by a host system such that speed of the tape and/or the length of the gap between blocks of data vary adaptively according to conditions sensed while the tape is moving so the tape drive's operating characteristics will best utilize the operational mode and availability of the host.

Tape drive apparatus heretofore proposed conventionally operates to advance the tape at one speed or at one of a plurality of operator selectable speeds. In data processing operations, high speed movement of the tape is efficient for certain types of applications such as archiving, interchange and disaster processing. In such applications, a new read or write instruction can be expected while the IBG on the tape is passing the read/write heads; i.e., in sufficient time before the next block of data is to be processed. Movement of tape at lower speeds is more efficient for other applications, such as journaling and normal processing, where data is read or written intermittently. The speed is therefore slow enough to permit the tape to stop at a point within the IBG from which, upon receipt of a delayed read or write instruction, it can be accelerated to a preselected low speed before the next block of data passes the read/write head.

If tape speed is excessive for the particular type of application being performed, a "backhitch" will occur because a new read or write command will not be received while the tape at the head is within the IBG. During a backhitch, the tape is brought to a stop downstream of the overrun IBG, then driven in a reverse direction and caused to come to rest at a point upstream of said IBG. The tape will remain stationary until a read or write instruction is received; whereupon it must accelerate as that IBG passes the read or write head, so that the tape will be at proper speed as it passes said head.

Assuming that a tape is driven at 100 ips (inches per second), a delay of over 1 second could occur as a result of each backhitch; whereas if that tape is driven at 12.5 ips, permitting the tape to stop within the IBG, the delay would merely be about 48 milliseconds, but the data rate would be considerably lower. Thus, whether operation at a particular higher speed or a particular lower speed is more efficient is a function of the lengths of the data blocks and the number thereof that can be processed without a backhitch; or, more properly, the ratio of the number of successive data blocks processed to the number of backhitches, for data blocks of a given length.

No prior art is known which discloses changing the tape feed speed adaptively during operation upon the occurrence of a predetermined condition, such as interblock gap overruns (backhitches), for the purpose of optimizing tape drive performance to best suit the operational mode or capability of the host system. U.S. Pat. No. 3,582,568 discloses an audiotape reproducing system wherein tape is normally fed at a nominal rate; but if the user wishes to skip from one musical selection recorded on the tape to a subsequent musical selection, he depresses a button that initiates a high speed advance of the tape until the head reaches the nonrecorded gap between selections. At that point it slows down in time to start playing the next selection at the nominal speed. This process can be repeated to skip unwanted intervening selections. Thus, the speed change is initiated by the operator.

U.S. Pat. No. 3,586,789 discloses apparatus wherein, during recording or playback of a block of information signals, the tape normally is fed at low speed; but between blocks of information, the tape is fed at high speed, speed being reduced just before the next block of data is to be processed. This apparatus employs signals recorded on a control track coextensively with information signals recorded on an information track.

U.S. Pat. No. 3,596,007 discloses an apparatus for reading tape on which a plurality of record tracks have been recorded at different speeds. Each record track consists of one channel carrying message information or data and a second channel having a predetermined constant frequency control signal recorded thereon to control the output voltage to a motor so that it will drive the tape at the appropriate speed called for by the frequency control signal. Here, again, the speed is controlled by indicia prerecorded on the tape.

U.S. Pat. No. 3,684,298 discloses a capstan-type tape drive wherein rotational speed of the capstan and hence the lineal speed of a magnetic tape can be selected manually by an operator.

U.S. Pat. No. 3,364,495 broadly discloses apparatus wherein the interblock gap is effectively maintained within a preselected range during writing and access time to the next block is improved if a write command is received within a preselected time period.

SUMMARY OF THE INVENTION

The principal object of this invention is to provide an apparatus and method for optimizing performance characteristics of a reel-to-reel tape drive best to suit the operational mode and/or availability of the host system that controls the tape drive.

Another object is to provide a dual-speed reel-to-reel tape drive apparatus conditioned to operate at a high speed under certain conditions and at a lower speed under other conditions, the particular tape speed being selected under control of a host system according to predetermined conditions sensed while the tape is being processed.

Still another object is to provide a tape drive apparatus and associated means for increasing the IBG during write operations in an attempt to reduce backhitches to an acceptable level before initiating a reduction in tape speed.

A further object is to provide a tape drive apparatus and associated means for increasing tape speed when sensed conditions indicate that operation could be conducted at a higher speed without an unacceptable level of backhitches.

Another object is to provide a dual speed tape drive apparatus using a dual speed clock whose frequency is selected to effect high or low speed mode operation.

According to these objects, the dual-speed reel-to-reel tape drive apparatus and host system embodying the invention comprise a backhitch counter and a block counter, the latter counting the number of data blocks processed. If tape is being fed at the higher speed, and the number of blocks processed divided by the number of backhitches experienced is less than a preselected number m, (indicating an unacceptable number of backhitches) during processing of a predetermined number of blocks a, a set long gap command SLG will be generated. This host-generated command will cause the tape drive to increase the gap between data blocks; i.e., the IBG. If backhitches still are excessive during processing of a blocks, then a set low speed/reset long gap command SLS/RLG will be generated to reduce the tape speed and restore the gap to its normal shorter length. This assumes that the higher speed is at least about six times higher than the lower speed so that the drastic speed reduction should cure the backhitch problem without requiring use of the longer IBG.

If while operating at the lower speed, the sensing circuitry including the counters indicates that the particular operation could be conducted at the higher speed without exceeding an acceptable level of backhitches, a set high speed command SHS will be generated to effect an increase in tape speed.

The foregoing and other objects, features, and advantages of the invention will become apparent from the following more particular description of a preferred embodiment thereof, as illustrated in the accompanying drawings.

DESCRIPTION OF PREFERRED EMBODIMENT

Figure 1:
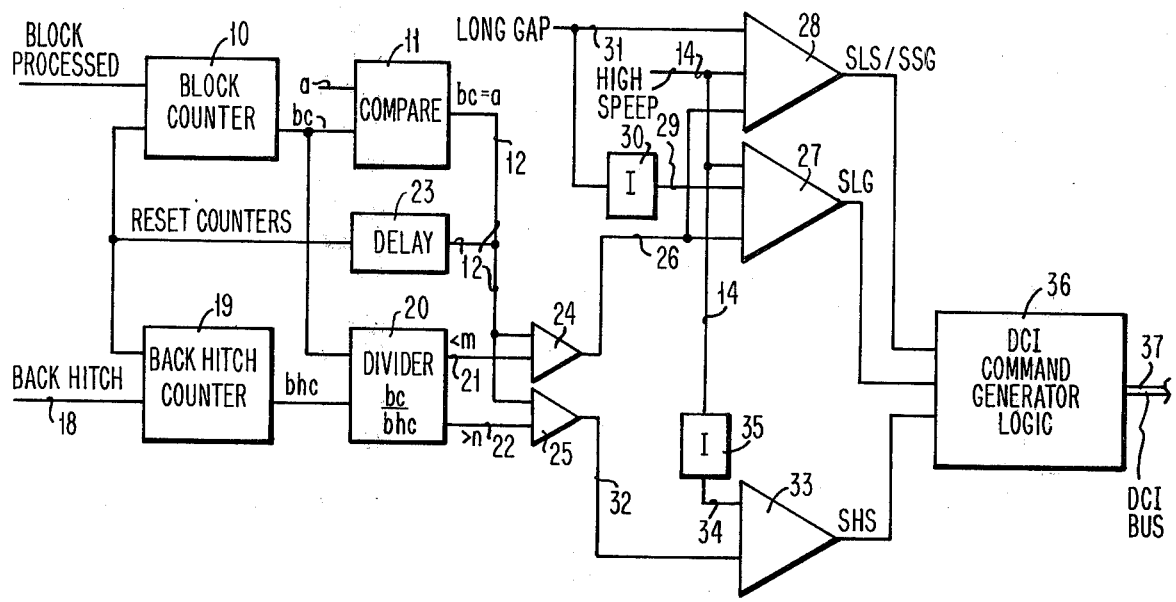
FIG. 1 is a logic diagram depicting functionally the logic performed, according to the invention, preferably by a host system that controls a tape drive apparatus.

As illustrated in FIG. 1, a host system that controls a reel-to-reel tape drive apparatus comprises means, such as a block counter 10, for counting the number of blocks of data recorded on a magnetic tape (not shown) as reading or writing of each block is completed. This count bc is transmitted to compare circuitry 11 that provides a signal in line 12 if block count bc exceeds a preselected number a (e.g., 40).

Meanwhile, whenever a signal comes up in a line 18, a backhitch counter 19 will be advanced. This will occur each time a backhitch occurs while operating at high speed; or, while operating at low speed, would have occurred had the drive been operating at high speed, as will become apparent from subsequent description. (It should be noted that, as used herein, "up" connotes a logical "1" and "down" a logical "0").

A divider circuit 20 divides the count bc from block counter 10 by the count bhc from backhitch counter 19. If this quotient is less than a preselected number m (e.g., 10), then a signal will come up in a line 21, indicating, for example, there were more than 4 backhitches per 40 blocks of data processed. If the quotient is greater than n (e.g., 20), indicating, for example, there were less than 2 backhitches per 40 blocks of data processed, then a signal will come up in a line 22. The values m and n are preferably sufficiently different to provide a "hysteresis" range so as to prevent excessive changes in operating mode as might result if backhitch occurrences fluctuated around a single threshold value.

When the number of blocks bc counted equals the preselected number a, the resultant up signal in line 12 will be transmitted through a delay line 23 to reset the block and backhitch counters 10 and 19. Meanwhile, this signal will be transmitted without delay to AND gates 24, 25. If at that time the number of backhitches exceeds a preselected number (illustratively assumed as 4 per 40 blocks), the up level signal in line 21 will be ANDed at 24, thus bringing up a signal in branches of line 26 leading to AND gates 27, 28. Other inputs to AND 27 are a branch of a line 14 (in which the signal is up while operating at high speed) and a line 29 which is connected by an inverter 30 to a long gap line 31. Thus the signal will be up in line 29 during operation with a normal (short) gap. Accordingly, if the number of backhitches exceeds the preselected number while writing at high speed and in short IBG mode, AND gate 27 will be enabled and cause a signal to come up in a set long gap line SLG. This will cause a transition to long gap operation in the manner presently to be described.

If at the time the signal comes up in line 26, the drive is operating at high speed (as denoted by line 14 being up) and in long gap mode (as denoted by a signal being up in the long gap line 31), gate 28 will provide an output in a set low speed/set short gap line SLS/SSG. This will cause a transition from high to low speed operation and concurrently reduce the IBG from the long to short gap, in the manner which will presently become more apparent.

Note that the gap is reduced to short gap because when operating at low speed, the tape will always stop at a point within the short IBG from which it can accelerate to proper speed upon receipt of the next instruction. Hence, no backhitches will occur when operating in this low-speed, short-gap mode. However, according to the invention, performance is monitored continuously to see if it can be upgraded from low to high speed operation. This is achieved as follows: During low speed operation, a signal will come up in line 18 if a backhitch would have occurred had the drive been operating in high speed mode. Hence, if data is being essentially continuously streamed, such that backhitches are less than a preselected lower number (i.e., less than the illustrative 2 per 40 data blocks processed), then the output of divider 20 (the quotient bc/bhc) will be greater than n. This will bring up a signal in line 22, with the result that if and when a signal comes up in line 12, AND gate 25 will be enabled and provide an output in a line 32.

An AND gate 33 has two inputs. One is line 32; the other is a line 34 connected via an inverter 35 to a branch of high speed line 14. Thus AND gate 33 will be enabled and generate a set high speed command SHS if, while operating at low speed, line 32 comes up and indicates that if the drive were to operate at high speed, backhitches would be below the preselected lower number (i.e. below 2 per 40 blocks processed).

Lines SLG, SLS/SSG and SHS are connected to director controller interface (DCI) command generator logic circuitry 36 which controls the output to a DCI bus 37. Bus 37 interconnects the host system with the tape drive apparatus (illustrated in FIG. 2).

Figure 2:
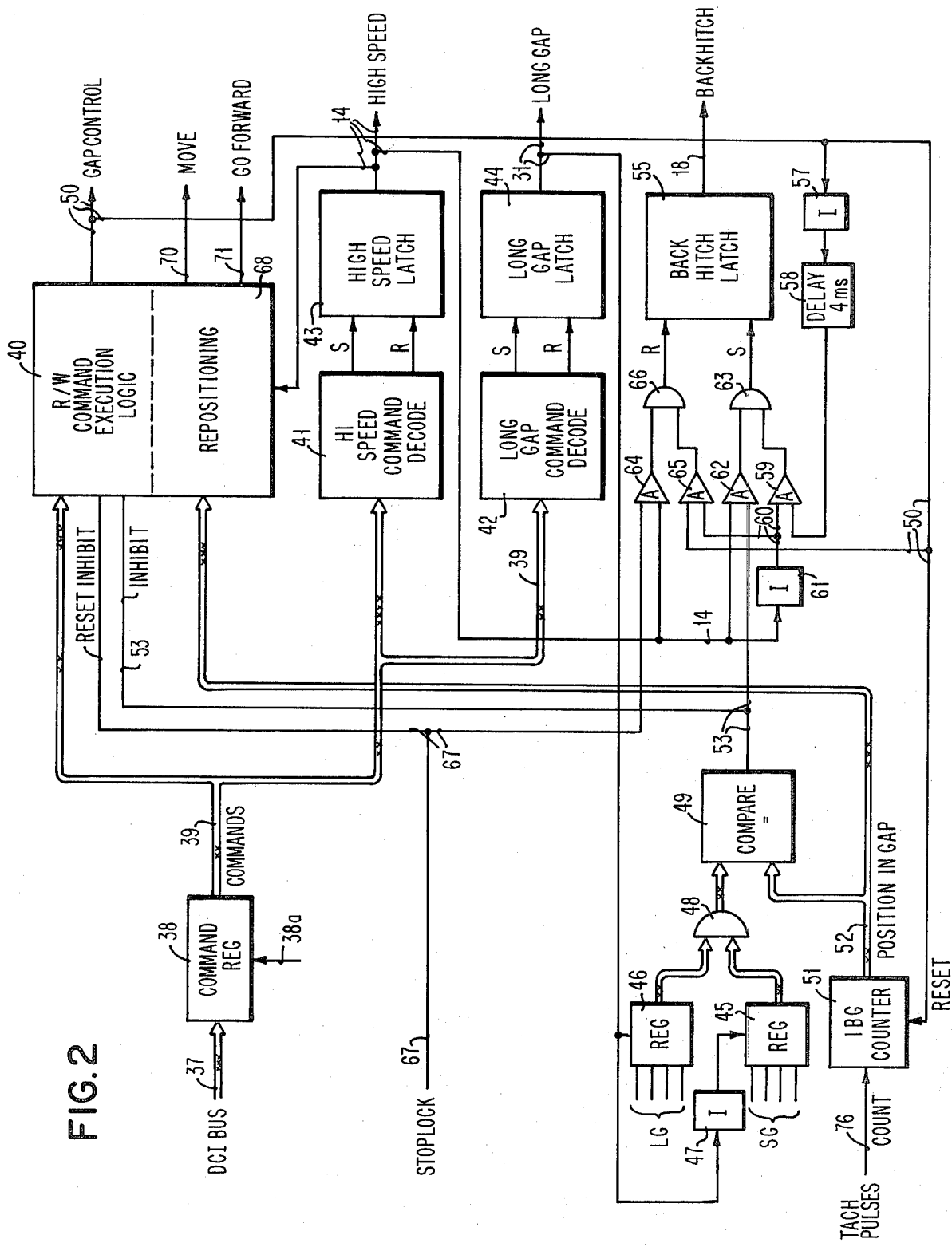
FIG. 2 is a circuit diagram depicting the circuitry, according to the invention, that is associated with the tape drive apparatus and communicates with the host system.

Referring now to FIG. 2, the DCI bus 37 transmits successive coded commands to a command register 38 in the tape drive apparatus. If the command is valid, a line 38a comes up to enable deposit of this command in register 38 and its transmission to a command bus 39. The commands in bus 39 are decoded later in time by read/write command execution logic circuitry 40, high speed command decode logic 41, and/or long gap command decode logic 42.

Decode logic 41 recognizes the SHS and SLS commands from the host. It sets a high speed mode latch 43 to provide an up level signal in high speed line 14 in response to an SHS command and resets the latch to provide a down level signal in line 14 in response to an SLS/SSG command.

Decode logic 42 recognizes the SLG and SLS/SSG commands from the host. It sets a long gap mode latch 44 to provide an up level signal in long gap line 31 in response to an SLG command and resets the latch to provide a down level signal in line 31 in response to an SLS/SSG command.

The output from long gap mode latch 44 is used to control selective gating out of either of two registers 45, 46, register 45 being connected to a branch of line 31 via an inverter 47. Registers 45 and 46 are preset to depict the number of tachometer pulses that should be sensed during a normal (short) IBG and a long IBG, respectively. The appropriate binary coded number from register 45 or 46 will be entered via OR gate 48 as an input to compare circuit 49, according to whether the signal in line 31 is down (indicating short gap) or up (indicating long gap), respectively.

Figure 4:
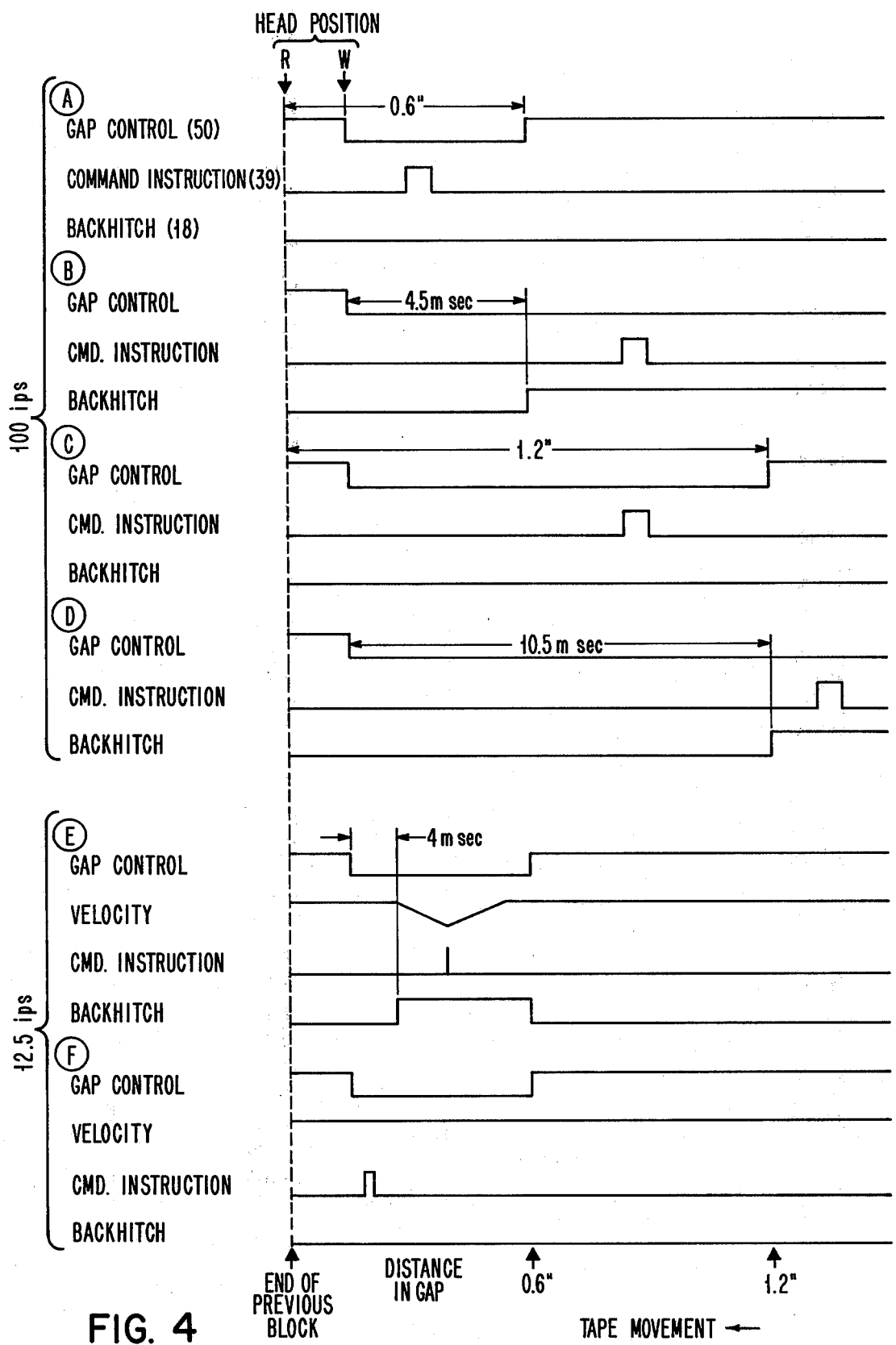
FIG. 4 is a timing diagram depicting operation under the various operational modes of the tape drive apparatus.

A gap control line 50 controls the length of the IBG. It must be up to enable reading or writing on the tape. Line 50 normally is up; but it goes down when deactivated by the read/write command execution logic circuitry 40 in response to completion of a readback check after writing of the data block is completed. Note that line 50 will not come back up at the end of the IBG unless a new read or write command is received (as illustrated in FIG. 4A) before the end of the IBG passes the read/write head. While line 50 is up, an IBG counter 51 will remain reset to zero. However, when gap control line 50 goes down, counter 51 will start counting tachometer pulses and provide an output in a line 52 which indicates the position in the IBG.

If the number of tachometer pulses in line 52 increases to a point where it equals the number preset via OR gate 48, signifying an overrun of the IBG, compare circuit 49 will provide an up level signal in line 53. This, among other things, will condition the read/write command execution logic 40 to inhibit a read/write command.

Meanwhile, the signal in line 18 is controlled by a backhitch latch 55, which is set and reset in the following manner. A branch of line 50 is connected via an inverter 57 and a short (4 millisecond) delay line 58 to AND gate 59. The other input to AND gate 59 is a line 60 that is connected via an inverter 61 to high speed line 14. Another AND gate 62 has as its two inputs branches of high speed line 14 and inhibit line 53. Backhitch latch 55 will thus be set via AND gate 62 and OR gate 63 and produce an up level signal in backhitch line 18 if, while operating in high speed mode, the output from compare circuit 49 indicates that the IBG has been overrun. Backhitch latch 55 can also be set via AND gate 59 and OR gate 63 if, while operating at low speed, gap control line 50 did not come up within 4 milliseconds as set by delay line 58. This indicates that, had the drive been operating in high speed mode, a backhitch would have occurred.

Backhitch latch 55 is reset to drop the backhitch signal in line 18 under the selective control of two AND gates 64, 65 whose outputs are ORed at 66. latch 55 will be reset via AND gate 64 if, while operating in high speed mode, a stoplock signal in a line 67 connotes that the tape, after having overrun the IBG, has then been driven in the reverse direction to a point upstream of said IBG and come to a stop. While operating in low speed mode, latch 55 will be reset via AND gate 65 when gap control line 50 goes up.

Tape repositioning control logic 68 receives the count from IBG counter 51 indicating the distance traveled (tachometer pulses) from the end of the previous block of data. This count determines what action will be taken by the tape drive in response to a new command or absence of a new command. When line 14 is up, indicating high speed operation, it will condition tape repositioning control logic circuitry 68 to continue to move the tape through the IBG. If a new read or write command is received via bus 39 before the preset (short or long) IBG is overrun, line 53 will remain down. Hence, the read/write command execution logic circuitry 40 will decode and respond to the command.

If no new command is received via bus 39 before the IBG is overrun, compare circuitry 49 will cause line 53 to come up and inhibit operation of the read/write execution logic circuitry 40. Concurrently, the tape position control logic 68 will effect a backhitch. This is done by bringing up move line 70 and bringing down a go forward line 71 to move the tape back to a certain position upstream of the overrun IBG. The tape drive will then stop at said position until a new command is received via bus 39. While stopped, the stoplock signal will come up in line 67 and reset the inhibit, thus allowing the read/write command execution logic circuitry 40 once again to respond to commands from bus 39.

Note that the aforementioned certain position is sufficiently upstream of the overrun IBG so that when the move and go forward lines 70, 71 come up, the tape can accelerate to proper speed by the time the end of the IBG passes the heads. Logic circuitry 40 will respond to a read or write command (either without a backhitch or following a backhitch) to bring up gap control line 50 at the appropriate time. This will reset the IBG counter 51 to zero preparatory to tracking progress through the next IBG.

Note that while operating in low speed mode, the tape repositioning control logic circuitry 68 will always cause the tape to stop in the IBG. Hence, a backhitch will never occur and read/write execution will never be inhibited. When operating in long gap mode, the host system has more time to pass a command to the command register 38 than during short gap mode; however, backhitches can occur. Therefore, in the example illustratively assumed, when overruns occur during high speed (100 ips) operation, it is preferable first to increase the IBG (from the illustrative 0.6" to 1.2") to see if this will reduce backhitches to an acceptable level; if not, then the IBG is restored to its normal short length (0.6"), but speed is reduced drastically (to 12.5 ips).

Note also that during read operations, the gap size is determined by the gap preformatted on the tape. Hence, whether or not a backhitch occurs will be determined by the preformatted gap. The long gap latch 44 is deactivated by a read command by suitable means (not shown).

Figure 3:
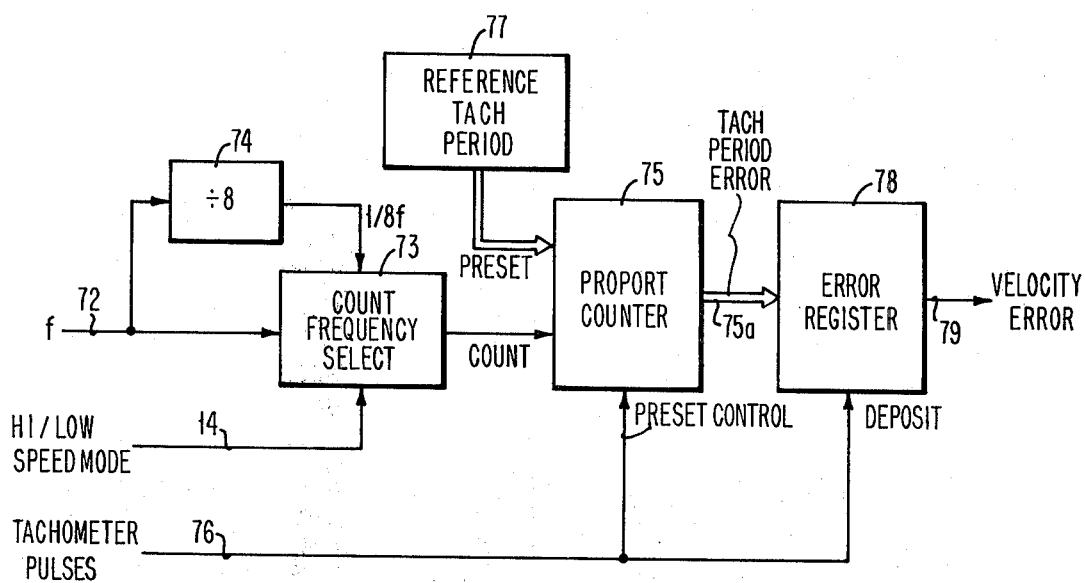
FIG. 3 is a schematic diagram depicting how circuitry in the tape drive apparatus selects clocking frequency to selectively effect feeding of the tape at the higher or lower speed.

According to a feature of the invention, the transition between speed modes is accomplished effectively with a minimum of additional circuitry. As illustrated in FIG. 3, pulses at a preselected clock frequency f are fed from a suitable oscillator (not shown) to a line 72. One branch of line 72 is connected directly to a frequency select switch 73. The other branch of line 72 is connected to switch 73 via a "divide by n counter" 74 (e.g. divide by 8). Switch 73 operates to provide to a proportional counter 75 a clocked output of frequency f or $\frac{1}{8}$ f, according to whether the high speed line signal in 14 is up (indicating high speed) or down (indicating low speed).

Entered in counter 75 from a suitable source 77 is a preset coded value corresponding to the number of clock pulses that should be generated during a nominal reference tachometer period. Counter 75 compares the actual number of clocking pulses from switch 73 with the aforementioned preset value and provides a binary coded tachometer period error signal in a bus 75a leading to an error register 78 as each tachometer pulse comes up in line 76. The pulse in line 76 deposits the error signal from bus 75a in the error register 78. This register provides a servo control signal in a velocity error bus 79 for monitoring the period of the tachometer waveform.

Further description of this aspect of the operation of the tape drive is not necessary for an understanding of the present invention. For further details, the reader is referred to U.S. Pat. No. 4,015,799 granted Apr. 5, 1977 to Koski, et al and assigned to the assignee of the present invention.

FIG. 4A-F constitutes a series of timing diagrams depicting the level of the signals in gap control line 50, command instruction bus 39 and backhitch line 18 during operation of the tape drive apparatus in the various modes above discussed.

FIG. 4A represents satisfactory operation without a backhitch in the high-speed, short-gap mode. As illustrated, a command instruction has been received while the short IBG is passing the head.

FIG. 4B depicts operation in the high-speed, short-gap mode. Here, however, the command instruction was not received in time, and hence backhitch line 18 came up to initiate a backhitch. If the number of backhitches exceeds the previously described acceptable level, appropriate commands will be issued by the host system to effect a transition to the mode shown in FIG. 4C.

FIG. 4C depicts operation in the high-speed, long-gap mode. As illustrated, the command instruction has been received in sufficient time within the long IBG, and hence no backhitch occurs.

FIG. 4D depicts operation in the high-speed, long-gap mode. Here, however, the command instruction was not received in sufficient time, despite the transition to the longer gap; and hence a backhitch occurs. If the number of backhitches exceeds the aforementioned acceptable level, the host system will issue appropriate commands to effect a transition to low-speed, short-gap mode, as depicted in FIG. 4E.

FIG. 4E depicts standard operation in the low-speed, short-gap mode. Note that, after each block of data is processed, the tape can come to a stop within the IBG. If it stops because no new command is received, it can upon eventual receipt of a command, be accelerated to appropriate velocity while still within the gap. Note that backhitch counter 55 will be reset via AND gate 65 by the gap control line 50 coming up in sufficient time; and hence no backhitches will occur.

FIG. 4F depicts operation in the low-speed, short-gap mode which could lead to a transition to high-speed, short-gap mode as depicted in FIG. 4A. Note that here the command instruction is being received very early in the gap, indicating that the host is operating in a streaming mode that could more efficiently be performed at the higher speed.

It will now be seen that, according to the invention, a method and apparatus have been disclosed whereby the operational characteristics of the tape drive apparatus (e.g. the tape speed and/or the length of the gap between blocks of data) can be changed automatically an adaptively best to suit the operational mode or requirements of the host system. It should be noted that, during previous discussion, it has been assumed that the host system was always available when needed and that operational mode would be controlled totally by the type of operation to be performed; e.g., archiving versus journalling. However, it will be understood that, even in an archiving situation where data would normally be streamed, the host may command a transition to a long gap or low speed mode if its availability must be widely shared and/or it must perform other tasks of higher priority.

Thus while the invention has been particularly shown and described with reference to a preferred embodiment thereof, it will be understood by those skilled in the art that various changes in form and detail may be made therein without departing from the spirit, scope and teaching of the invention. Accordingly, the apparatus and method herein disclosed are to be considered merely as illustrative and the invention is to be limited only as specified in the claims.

What is claimed is:

1. Apparatus for varying lineal speed of a magnetic tape in a tape transport system adaptively as necessary best to suit the operational mode or availability of a host system, said apparatus comprising:
    means normally operative to advance the tape at one speed for processing blocks of digital data continuously, but operative during advancement of the tape at said one speed to provide a backhitch signal in response to a condition requiring a backhitch operation;
    means including means responsive to a preselected occurrence rate of said backhitch signals for causing the tape to be advanced at a preselected lower speed less than said one speed, thereby to minimize the likelihood of further backhitches; and
    means operative during writing of data on the tape to increase the gaps between adjacent blocks of such data from a normal length to a longer length in response to a predetermined occurrence rate of said backhitch signals.

2. Apparatus according to claim 1, wherein said gap increasing means is operative to increase said gaps as a first corrective action, and said means for causing the tape speed to be advanced at said lower speed is operative only if backhitch signals exceeding said preselected rate are received after said gaps have been lengthened.

3. Apparatus for varying lineal speed of a magnetic tape in a tape transport system adaptively as necessary best to suit the operational mode or availability of a host system, said apparatus comprising:
    means normally operative to advance the tape at one speed for processing blocks of digital data continuously, but operative during advancement of the tape at said one speed to provide a backhitch signal in response to a condition requiring a backhitch operation;

means including means responsive to a preselected occurrence rate of said backhitch signals for causing the tape to be advanced at a preselected lower speed less than said one speed, thereby to minimize the likelihood of further backhitches; and clocking circuitry for controlling operation at both said one speed and lower speed, said circuitry including a divide by n counter; and a frequency selection switch operative to provide clocking pulses at a frequency f or f/n, respectively, according to whether the apparatus is conditioned for operation at said one speed or lower speed.

4. Apparatus for varying lineal speed of a magnetic tape in a tape transport system adaptively as necessary best to suit the operational mode or availability of a host system, said apparatus comprising:

means normally operative to advance the tape at one speed for processing blocks of digital data continuously, but operative during advancement of the tape at said one speed to provide a backhitch signal in response to a condition involving the failure to timely receive a read or write command and requiring a backhitch operation;

means including means responsive to a preselected occurrence rate of said backhitch signals for causing the tape to be advanced at a preselected lower speed less than said one speed, thereby to minimize the likelihood of further backhitches, and means operative during operation at said lower speed to effect an increase in tape speed to said one speed responsively to such commands being received timely enough so that backhitches would not occur at more than a predetermined rate if the tape were being advanced at said one speed.

5. Apparatus to claim 4, wherein said predetermined rate is less than said preselected rate to provide a "hysteresis" range for reducing speed variations.

6. Apparatus for controlling, adaptively as necessary best to suit the operational mode or availability of a host system, the length of the gap between adjacent blocks of digital data during writing of such data on a magnetic tape in a tape transport system, said apparatus comprising:

means operative when successive write commands are timely received from the host system to cause data to be written on the tape continuously with a preselected normal gap between blocks;

means responsive to the absence of a timely write command from the host system to generate a backhitch signal for initiating a backhitch operation; and means including means responsive to said backhitch signals exceeding an acceptable rate to cause data to be written with a preselected longer gap between blocks, thereby to minimize the likelihood of further backhitches.

7. Apparatus according to claim 6, including means, operative if backhitches continue to exceed said acceptable rate despite lengthening of said gap, to cause data to once again be written with said preselected normal gap and concurrently cause the lineal speed of the tape to be reduced to a preselected low value at which backhitches will not occur.

8. A method of controlling lineal speed of a magnetic tape in a tape transport system, said method comprising the steps of:

advancing the tape at one speed for processing blocks of digital data continuously at a fast rate so long as successive read or write commands continue to be timely received;

initiating a backhitch whenever such a command is not timely received;

advancing the tape at a preselected lower speed if backhitches exceed a predetermined rate; and increasing the gaps between adjacent blocks of such data from a normal length to a longer length if backhitches exceed a predetermined rate during writing of data on the tape.

9. A method for adaptively controlling the length of the gap between adjacent blocks of digital data during writing of such data on a magnetic tape in a tape transport system, said method comprising the steps of:

writing data on the tape continuously with a certain gap between successive blocks so long as successive write commands are timely received;

initiating a backhitch whenever a timely write command is not received; and increasing the gap between successive blocks if and when backhitches exceed an acceptable rate.

10. A method according to claim 9, including as a further step, when backhitches continue to exceed said acceptable rate despite increasing said gap:

resuming said normal gap and concurrently reducing lineal speed of the tape to a preselected low value at which backhitches will not occur.

* * * * *